May 12, 1970     H. J. GERBER ET AL     3,512,066

MOTOR ENERGIZING SYSTEM

Filed March 8, 1967     2 Sheets-Sheet 1

INVENTORS
LEONARD G. RICH
HEINZ JOSEPH GERBER
BY
McCormick, Paulding & Huber
ATTORNEYS

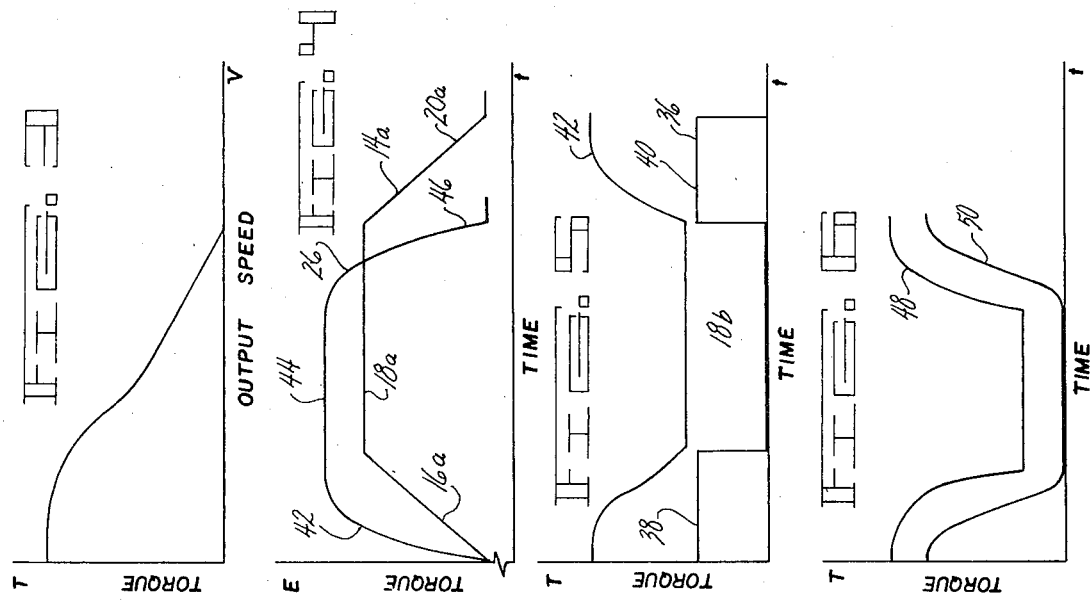
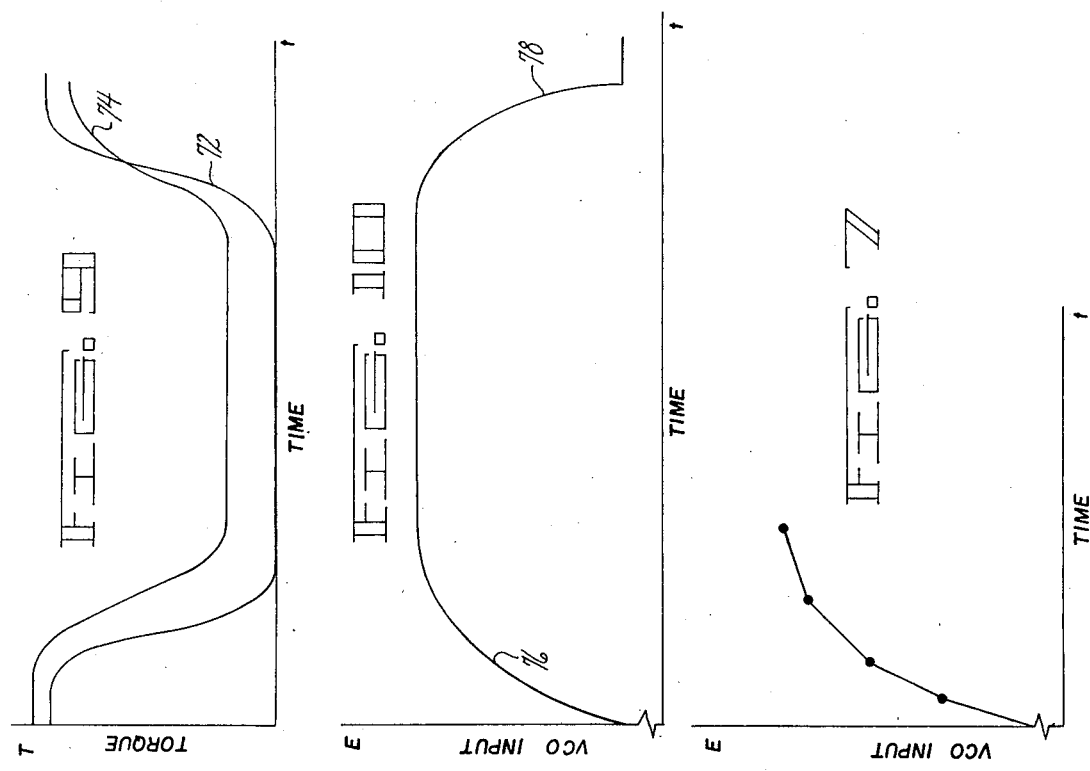

3,512,066
Patented May 12, 1970

3,512,066
MOTOR ENERGIZING SYSTEM
Heinz Joseph Gerber and Leonard G. Rich, West Hartford, Conn., assignors to The Gerber Scientific Instrument Company, South Windsor, Conn., a corporation of Connecticut
Filed Mar. 8, 1967, Ser. No. 621,593
Int. Cl. H02k 29/02
U.S. Cl. 318—138                                    16 Claims

ABSTRACT OF THE DISCLOSURE

In a stepping motor drive system for a plotter, machine tool or the like, a means is provided for controlling both the acceleration and deceleration of the drive motor in such a manner that the actual values of acceleration and deceleration vary during the acceleration and deceleration periods so as to derive a maximum amount of available torque from the motor at all speeds. This is achieved by using a signal having an argument with non-linear ramp portions for controlling the output frequency of a pulse generator forming part of the motor driving circuit. The signal may be either one wherein the argument is a characteristic analogously related to the output frequency of the pulse generator or one wherein the argument is a digital representation of a number the magnitude of which is related to the output frequency of the pulse generator.

---

This invention relates to systems for energizing electric drive motors, and deals more particularly with a system for energizing a drive motor which is repeatedly accelerated and decelerated at short intervals to move an associated load in similar fashion.

The motor energizing system of this invention finds particular utility in connection with drive motors for machine tools, plotters or the like wherein the motor is repeatedly accelerated and decelerated to move an associated tool, print head, pen or the like relative to a workpiece, sheet of paper or similar article. For example, in an X–Y plotter two motors, or combinations of motors, are used for driving a print head or pen in the X and Y directions, respectively, relative to the plotter table. A numerically controlled device is conventionally used to control the energization of the drive motors, and conventionally the operation is such that the print head or pen is moved in a straight line manner with the pen decelerating at the end of each line. That is, at the beginning of each line the print head or pen is either stationary or moves at a low relative velocity. The drive motors are then energized by the associated controller to accelerate the print head or pen along a straight line toward a new point, and upon approaching this point the print head or pen is again decelerated; the process thereafter being repeated line by line until the desired shape is drawn or the desired points plotted. In the case of drawing a curved line, the line may be synthesized from a large number of straight line segments or increments with the pen stopping or slowing down at the end of each segment. The speed at which any line or line segment may be drawn depends not only on the maximum speed at which the drive motors are operated, but also on the time required for accelerating the motors to the maximum speed at the beginning of the line and the time required for decelerating the motors at the end of the line. The drive motors are required to deliver higher output torques during the periods of acceleration and deceleration then when operating at constant speed, and the overall performance is largely dependent upon the amount of torque available during acceleration and deceleration. The motors customarily used, particularly stepping motors, have an available output torque versus speed characteristic such that the available output torque decreases with increases in speed. During the operation of a motor, the torque load imposed thereon, to prevent stalling or the skipping of pulses in the case of a stepping motor, may not exceed the available output torque for the particular speed at which the motor is operating. In the past the motors have been energized in such a manner that optimum use has not been made of the available torque at all speeds. Accelerations, throughout the speed range, have been constant and limited by the low torque available at higher speeds. This results, in the case of a plotter for example, in a greater time for each line segment drawn than would be required if the motors were energized to make better use of the torque available at low speed. In the description which follows the motor energizing system of this invention is described in association with a stepping motor, this being the preferred use of the system. It should be understood however that the invention, at least in its broader aspects, is not necessarily limited to stepping motors but has broad application to other motors with torque versus speed characteristics generally similar to that of a stepping motor.

The general object of this invention is, therefore, to provide a motor energizing system which allows a drive motor to accelerate and decelerate a load in less time than previously required. In keeping with this object, a further object of the invenition is to provide a motor energizing system particularly useful in association with the drive motors of an X–Y plotter or the like to enable the plotter to execute the drawing of a number of lines, or the plotting of a number of points, at a greater average speed than heretofore possible.

Another object of this invention is to provide a motor energizing system for energizing a motor having an available torque versus output speed characteristic such that the available torque decreases with the output speed and wherein the motor is or may be energized so as to deliver a very large proportion of its available torque throughout the entire period of accelerating a load from a stationary condition to an appreciable speed and throughout the entire period of decelerating the load from such speed back to a stopped condition.

A further object of this invention is to provide a motor energizing system such as described in the preceding paragraph and wherein the energization programs for acceleration and deceleration may be independently designed so as to take into consideration friction in the load system which friction tends to oppose acceleration and aid deceleration.

Other objects and advantage of the invention will be apparent from the following description and from the drawing forming a part hereof.

The drawings show preferred embodiments of the invention and such embodiments will be described, but it will be understood that various changes may be made from the constructions disclosed, and that the drawings and descriptions are not to be construed as defining or limiting the scope of the invention, the claims forming a part of this specification being relied upon for that purpose.

Of the drawings:

FIG. 5 is a graph showing both the required torque and the available torque with regard to a drive motor energized according to the conventional program of FIG. 4.

FIG. 6 is a graph showing the required torque and the available torque with regard to a drive motor energized in accordance with the program of this invention.

FIG. 7 is a graph showing the actual up-ramp energization program as provided by the shaping network of FIG. 2.

FIG. 8 is a schematic diagram illustrating a motor energizing system comprising another embodiment of this invention.

FIG. 9 is a graph showing the torque required when energizing a motor in accordance with this invention assuming no friction in the load and also showing the torque required assuming both viscouse and coulomb friction in the load.

FIG. 10 is a graph illustrating a program of motor energization achieved by the system of FIG. 8 to take into account the effect of friction.

FIG. 11 is a schematic diagram illustrating a motor energizing system comprising another embodiment of this invention.

Figure 1:
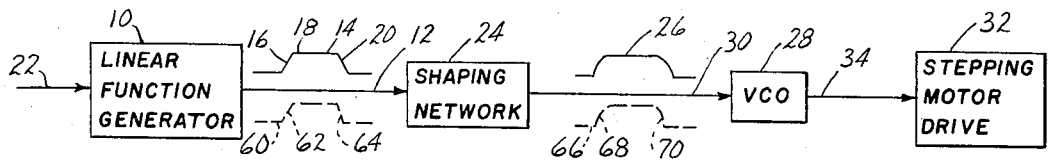
FIG. 1 is a schematic diagram showing a motor energizing system of the present invention.

Turning now to the drawings and first considering FIG. 1, the motor energizing system shown by this figure comprises a linear function generator 10 which operates to produce an output voltage signal on the output line 12 controlling motor velocity, and having a form such as that shown at 14. This signal includes an initial linear rise stage, indicated at 16, during which the magnitude of the voltage increases linearly with time from a base value to a maximum value, an intermediate stage, indicated at 18, during which the magnitude of the signal remains at a substantially constant value, and a decay stage, indicated at 20, during which the magnitude of the voltage decreases linearly from the maximum value back to its base value. The rise stage is commonly referred to as an "up-ramp," and the decay is commonly referred to as a "down-ramp." The lengths of time required for the up-ramp and the down-ramp are generally equal, but may sometimes be different as hereinafter described to account for friction in the load. The period of the intermediate stage 18 is, however, variable and depends on the amount by which the load is to be moved. In the case of very short movements the voltage signal may not have sufficient time to reach its maximum value, in which case the signal consists of merely an up-ramp and a down-ramp each of lesser duration than the two shown. The linear function generator 10 is controlled in response to command signals supplied by an input line 22, the command signals being produced by an associated numerically controlled computer or similar control device. In the past, linear voltage signals similar to that shown at 14 in FIG. 1 have been used for directly energizing the associated drive motor, and such function generators are well known in the art and need not be described in detail.

Instead of using a linear voltage function, such as shown at 14 in FIG. 1, for directly controlling the associated motor, the system of FIG. 1 includes a shaping network 24 which operates to convert the linear function to a function, such as shown at 26, having curved or non-linear ramps during the acceleration stage and the deceleration stage. The non-linear voltage signal is in turn used to drive the associated motor in such a manner that the speed of the motor is directly related to the magnitude of the signal. In the system illustrated in FIG. 1 the voltage signal 26 is transmitted to a voltage controlled oscillator 28 by the line 30, the voltage controlled oscillator 28 in turn producing driving pulses transmitted to an associated stepping motor drive 32 by a line 34. The magnitude of the voltage signal applied to the voltage controlled oscillator determines the frequency or repetition rate of the pulses produced thereby and the frequency of the pulses in turn determines the speed of the motor. The stepping motor drive 32 may include a single stepping motor or a number of stepping motors connected together to produce a single output as shown in Pat. No. 3,146,386 or Pat. No. 3,268,785. In any event, the voltage controlled oscillator 28 and the stepping motor drive 32 are or may be of generally conventional construction and need not be described in detail.

Figure 3:
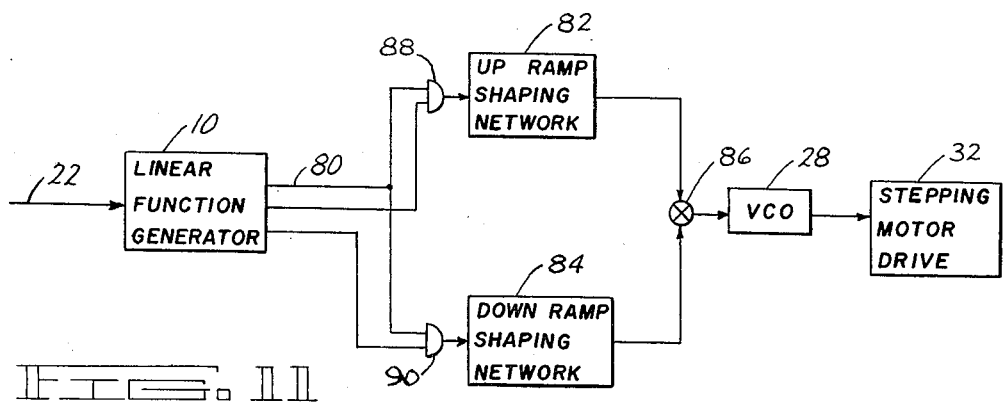
FIG. 3 is a graph showing the available torque versus output speed characteristic of a typical drive motor of the type used with the system of FIG. 1.
Figure 4:
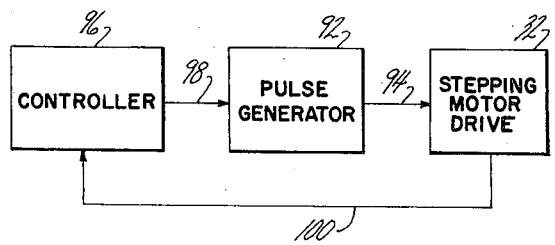
FIG. 4 is a graph showing both a conventional program of motor energization as achieved by this invention.

The results achieved by the system of FIG. 1 will be better understood by reference to FIGS. 3 to 6. FIG. 3 is a graph showing the available torque versus output speed characteristic of a typical stepping motor. From this figure, it will be noted that the characteristic is such that a maximum amount of torque is available at low speeds and that the available torque drops to a relatively low value as the speed is increased. In FIG. 4 the wave form 14a illustrates a voltage signal as produced by the linear function generator 10 and as would be conventionally applied directly to the voltage controlled oscillator 28. The wave form 26 illustrates the voltage signal produced by the shaping network 24 and which, in the system of this invention, is applied to the voltage controlled oscillator to produce the same movement of the load as would the wave form 14a applied to the voltage controlled oscillator. FIG. 5 shows the torque relationships obtained if a conventional linear function, such as that shown at 14a in FIG. 4, is applied directly to the voltage controlled oscillator 28. More particularly, the wave form 36 in FIG. 5 indicates the torque required by the drive motor assuming no coulomb or viscous friction in the load, coulomb friction being that having constant retarding force opposing movement of the load and viscous friction being that exerting a force which is directly proportional to velocity. Due to the fact that the up-ramp 16a and the down-ramp 20a of the wave form 14a are linear, a constant torque, as indicated at 38, is required during acceleration and a similar constant torque, as indicated at 40, is required during deceleration. After the load is accelerated to the maximum speed, no torque is required to maintain such speed during the intermediate stage indicated by the portion 18b of the line 38 of FIG. 5.

The line 42 in FIG. 5 illustrates the available torque, and for proper operation of the motor it is essential that the available torque line 42 be at all times above or greater than the required torque line 36, the lines 36 and 42 both representing absolute values of torque. In comparing the lines 36 and 42 of FIG. 5, it will be evident that during large portions of the acceleration and deceleration stages the motor is operated at a torque having an absolute magnitude considerably less than the absolute magnitude of its available torque. In accordance with the invention a closer matching of the required torque line with the available torque line is achieved by using a voltage signal, such as the signal 26 of FIG. 1, having non-linear up and down ramps for operating the associated voltage controlled oscillator or similar motor driving device. In FIG. 4 the voltage signal indicated at 26 is the one produced by the shaping network 24 of FIG. 1 and its use results in the same amount of movement of the load as would the accompanying signal 14a if the signal 14a were applied directly to the voltage controlled oscillator 28. The signal 26 has a non-linear up-ramp state 42, an intermediate stage 44, and a non-linear down-ramp stage 46. During the non-linear up-ramp stage 42 the magnitude of the signal increases at a decreasing rate, the rate of increase initially being relatively large and tapering off to substantially zero when reaching the intermediate stage 44. The non-linear down-ramp stage 46 is substantially a mirror image of the up-ramp stage with the magnitude of the signal decreasing at an increasing rate.

FIG. 6 shows the relationship between the available torque and the required torque obtained by using the wave form 26 of FIG. 4 to drive the voltage controlled oscillator 28. The line 48 represents the available torque and the line 50 represents the required torque. From inspecting this figure, it will be noted that the required torque is at all times below the available torque, as necessary, and the difference between the required and available torque is maintained at a relatively low value throughout the entire period of operation of the motor. That is, the motor is operated so that it is started at a relatively high torque with the torque thereafter diminishing as the maximum operating speed is reached, and during deceleration the motor is decelerated so that the torque is initially small and increases to a relatively high value. Torque is directly related to acceleration. Therefore the result of this is that the load is, when started, initially accelerated at a high rate with the rate decreasing until the maximum operating speed is reached. Then, during deceleration, it is decelerated at an initially low rate with the rate increasing to a final high rate. The results of this are two fold: first, the acceleration and the deceleration stages may be performed in less time than required when using a linear function signal, and, second, a higher maximum useful operating speed may be obtained. The overall desirable result of this is that the amount of time required to move the load from one point to another is reduced by a considerable amount as evident from FIG. 4.

Figure 2:
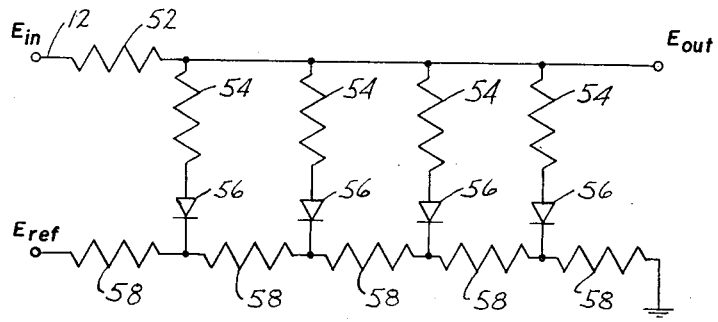
FIG. 2 is a schematic diagram of the shaping network employed in the system of FIG. 1.

The shaping network 24 may take various different forms without departing from the invention, and a suitable network is shown by way of example in FIG. 2. Referring to FIG. 2, the network there shown comprises a first resistor 52 and a number of parallel circuits connected to one end thereof, the parallel circuits each consisting of a resistor 54 and a diode 56. In the network of FIG. 2 four such parallel circuits are illustrated, however, more or less circuits may be employed if desired. The output line 30 is connected to the junction between the resistor 52 and the parallel circuits. The opposite ends of the parallel circuits are maintained at different voltage levels by a reference circuit comprising five resistors 58, 58, connected as shown in FIG. 2, the right-hand end of the right-hand resistor 58 being grounded and the left-hand end of the left-hand resistor 58 being connected to a source of reference voltage. The four resistors 54, 54 are of different values with the values increasing in going from the left-hand resistor to the right-hand resistor. From inspection of the network of FIG. 2, it will be obvious that as the input voltage applied to the line 12 varies in a linear fashion, as during the up-ramp stage 16a or the down-ramp stage 20a of the signal 14a of FIG. 4, the output appearing at the line 30 will vary at different rates as different ones of the diodes 56, 56 conduct. For example, as the input voltage increases from a low value the output voltage will increase at a given rate until the right-hand diode 54 begins to conduct. Thereafter, the output voltage will, as a result of further increase in the input voltage, increase at a lower rate until the second diode from the right begins to conduct. The output voltage will then increase at a still lower rate until the next diode conducts, etc. The result is a waveform which approximates that shown at 26 in FIG. 4. The actual output voltage obtained on the line 30 during the up-ramp stage is shown in FIG. 7. Closer approximations to the desired curve shown in FIG. 4 may be obtained by using a greater number of parallel circuits in the shaping network, however, the four segment curve of FIG. 7 has been found to provide quite satisfactory results.

The system described in the preceding discussion has ignored the existence of friction in the load system. Where friction is a significant factor, the motor energizing system of this invention may be designed to take into account the friction forces and to provide a drive program especially suited to the load. The general effect of friction, both coulomb friction and viscous friction, is to oppose the acceleration of the load during the rise or up-ramp stage and to assist the deceleration of the load during the decay or down-ramp stage. A further effect is to require the delivery of a substantial amount of torque during the intermediate or constant velocity stage. Because greater torque is required during acceleration than during deceleration, a saving in time may be effected by energizing the motor differently during acceleration than during deceleration.

FIG. 9 shows the relationship between the torque delivered during a given drive program assuming no friction and assuming both viscous and coulomb friction. The line 72 shows the required torque for a condition of no friction in the load and the broken line 74 shows the torque required for the existance of a substantial amount of both viscous and coulomb friction in the load. In comparing the two lines 72 and 74, it will be obvious that the existance of friction in the load produces a requirement for a greater amount of torque during the acceleration or up-ramp stage and a lesser amount of torque during the decay or down-ramp stage. FIG. 10 shows a voltage signal which may be used to drive the voltage controlled oscillator 28 and which includes an up-ramp stage 76 different from its down-ramp stage 78 to account for the existance of friction in the load. More particularly, it will be noted that the magnitude of the voltage is increased at a lesser average rate during the up-ramp stage 78 than it is during the down-ramp stage 78. The overall effect of this is that the required torque is more closely matched to the available torque to still further increase the speed at which the motor may be repeatedly started and stopped.

The shaping of the voltage signal to account for friction may be effected either by changing the shape of the fundamental voltage signal provided by the linear function generator 10 or by providing a shaping network which shapes the up-ramp differently from the down-ramp. In FIG. 1 the broken line indicated at 60 represents a fundamental voltage signal which may be used to take into account the effects of friction. In this voltage signal the up-ramp, indicated at 62 is of a lesser slope than the down-ramp indicated at 64. As a result of this, the shaping network 24 produces a resultant signal 66 having an up-ramp 68 which has an average slope less than the associated down-ramp 70 and which accordingly requires a greater amount of time than the down-ramp 70.

FIG. 8 shows an alternative method for shaping the up-ramp differently from the down-ramp. In the system of FIG. 8 the linear generator 10 produces, on the line 80, a linear function similar to the function 14 of FIG. 1 having a down-ramp the mirror image of the up-ramp. Associated with the linear function generator 10 are two separate shaping networks 82 and 84, the up-ramp shaping network 82 being connected to the line 80 during the up-ramp and intermediate stages of the voltage signal and the down-ramp shaping network 84 being connected to the line 80 during the down-ramp stage of the voltage signal. The outputs of the two shaping networks 82 and 84 are combined, through a summing device 86, and applied to the voltage controlled oscillator 28 which in turn drives the associated stepping motor drive 32. The signal appearing on the line 80 is switched between the up-ramp shaping network 82 and the down-ramp shaping network 84 by two AND gates 88 and 90 controllable by suitable gate signals applied thereto by the linear function generator, the gate 88 being turned on during the up-ramp and intermediate stages and the gate 90 being turned on during the down-ramp stage. By properly designing the up-ramp shaping network and the down-ramp shaping network, the resulting waveform applied to the voltage controlled oscillator 28 may be made to have any shape as required to match the delivered torque to the available torque.

In the foregoing systems, as shown in FIGS. 1 and 8, the pulses used for stepping the stepping motor drive are derived from a pulse generator in the form of a voltage controlled oscillator 28 wherein the frequency or repetition rate of the output pulses is determined by the magnitude of the voltage of the applied voltage signal. That is, the frequency at which the stepping motor is stepped is analogously related to the voltage signal. It should be understood, however, that the invention is not necessarily limited to analog systems and if desired a digital system may be used wherein the output frequency of the pulse generator is controlled by digital signals. In an analog system the output frequency of its pulse generator is related to an argument which is the magnitude of one characteristic of the input signal. In a digital system the output frequency of the pulse generator is also related to an argument presented by the input signal but in this case the argument is the magnitude of a number represented in digital form by the input signal.

FIG. 11, by way of example, shows a basic form of system utilizing the digital approach. In this system a pulse generator 92 is employed and produces output pulses, on the line 94, which controls the stepping motor drive 32. The pulse generator 92 is in turn controlled by a controller 94 which supplies signals to the pulse generator over the line 98. The actual position of the stepping motor or the part driven thereby is provided to the controller 96 by means of a suitable encoder in the stepping motor drive which produces a position signal transmitted to the controller 96 over the line 100.

The pulse generator 92 of the FIG. 11 system may be any well known form of digitally controlled device capable of producing output pulses on the line 94 at a rate related to the magnitude of the number represented by the digital signal supplied by the input line 98. For example, the pulse generator 92 may be in binary rate multiplier or a digital differential analyzer. In the case of a binary rate multiplier a clock is provided which produces clock pulses at a rate far greater than the maximum pulse rate required at the output line 94. Switching circuits are included in the binary rate multiplier and are set by the digital input signal so as to allow some fraction of the clock pulses to be delivered to the line 94. The value of this fraction depends on the input argument which is the number represented by the digital signal. The controller 96 includes a suitable input (not shown), such as a punched paper tape reader, providing information as to the various points to which the stepping motor drive is to be driven. In the controller 96, the instantaneous velocity of the stepping motor drive is computed from the position signals derived from the line 100 and the optimum acceleration for that velocity is determined. The signal supplied to the pulse generator 92 over the line 98 is then varied at such a rate as to change the output pulse frequency in accordance with the computed acceleration capabilities.

As an alternative to computing the optimum acceleration from the instantaneous velocity of the stepping motor drive, a ramp shaping circuit may be used in the controller 96 to allow an analog generation of the ramp, but nevertheless the output to the pulse generator 92 is in digital form. In any event, it should be noted that during the acceleration and deceleration stages the signal supplied by the controller 96 to the line 98 changes continuously to continuously increase or decrease the speed of the stepping motor drive, and the rate of change of the signal is varied by the controller so that the acceleration or deceleration values instead of being constant are ramped in non-linear fashion to obtain maximum use of the torque available from the motor.

The invention claimed is:

1. In a system for energizing a drive motor the combination comprising, a drive motor, means for producing a signal which is independent of the condition of said drive motor and having an initial rise stage during which the argument thereof rises from a first value to a second value at a rate which progressively decreases with time without increasing at any point, having an intermediate stage during which the argument thereof remains substantially at said second value, and having a final decay stage during which the argument thereof decays from said second value to said first value at a rate which progressively increases with time without decreasing at any point, and means responsive to said signal for driving said drive motor at a speed directly related to the argument of said signal.

2. The combination defined in claim 1 further characterized by said means for producing a signal being such that said signal is a voltage signal the argument of which is the magnitude of its voltage.

3. The combination defined in claim 1 further characterized by said means for producing a signal being such that said signal is a digital signal the argument of which is the magnitude of the number represented thereby.

4. In a system for energizing a drive motor the combination comprising, a drive motor, means for producing a signal having an initial rise stage during which the argument thereof rises from a first value to a second value at a decreasing rate, having an intermediate stage during which the argument thereof remains substantially at said second value, and having a final decay stage during which the argument thereof decays from said second value to said first value at an increasing rate, and means responsive to said signal for driving said drive motor at a speed directly related to the argument of said signal, said means for producing a signal comprising a means for producing a fundamental voltage signal having an initial rise stage during which the magnitude thereof rises at a substantially constant rate, having an intermediate stage during which the magnitude thereof remains substantially constant, and having a final decay stage during which the magnitude thereof decays at a substantially constant rate, and a shaping network having said fundamental voltage signal as an input thereto, said shaping network including means for producing an output voltage which varies nonlinearly with the input thereto and in such a manner that the output voltage increases at a decreasing rate with increases in the input voltage and decreases at an increasing rate with decreases in the input voltage.

5. The combination defined in claim 4 further characterized by said means for producing a fundamental voltage signal including means for causing the magnitude of said fundamental voltage signal to decrease at a higher rate during said decay stage than the rate of increase during said rise stage.

6. The combination defined in claim 5 further characterized by said drive motor being a stepping motor, and said means responsive to said signal for driving said stepping motor including a means for producing driving pulses transmitted to said stepping motor the pulse repetition rate of which pulses is directly related to the magnitude of the voltage of said signal.

7. The combination defined in claim 4 further characterized by said means for producing a fundamental voltage signal including means for causing the magnitude of said fundamental signal to decrease at a rate during said decay stage substantially equal to the rate of its increase during said rise stage, said shaping network including an up-ramp shaping network and a down-ramp shaping network, and means for switching said fundamental signal to said up-ramp shaping network during said rise stage and to said down-ramp during said decay stage, said up-ramp shaping network having an output voltage to input voltage characteristic different from that of said down-ramp shaping network.

8. The combination defined in claim 7 further characterized by said drive motor being a stepping motor, and said means responsive to said signal for driving said stepping motor including a means for producing driving pulses transmitted to said stepping motor the pulse repetition rate of which pulses is directly related to the magnitude of the voltage of said signal.

9. The combination defined in claim 1 further characterized by said drive motor being a stepping motor, and said means responsive to said signal for driving said stepping motor including a means for producing driving pulses transmitted to said stepping motor the pulse repetition rate of which pulses is directly related to the argument of said signal.

10. The combination defined in claim 9 further characterized by said means for producing a signal being such that said signal is a digital signal the argument of which is the magnitude of the number represented thereby.

11. The combination defined in claim 9 further characterized by said means for producing a signal being such that said signal is a voltage signal the argument of which is the magnitude of its voltage.

12. The combination defined in claim 11 further characterized by said means for producing driving pulses including a voltage controlled oscillator the output frequency of which is controlled by said voltage signal.

13. In a system for energizing a drive motor the combination comprising, a drive motor, means for producing a signal having an initial rise stage during which the argument thereof rises from a first value to a second value at a decreasing rate, having an intermediate stage during which the argument thereof remains substantially at said second value, and having a final decay stage during which the argument thereof decays from said second value to said first value at an increasing rate, and means responsive to said signal for driving said drive motor at a speed directly related to the argument of said signal, said means for producing a signal including means for causing the argument of said signal to decay at a higher average rate during said decay stage than its average rate of increase during said rise stage with the result that said decay stage occurs over a shorter period of time than said rise stage.

14. The combination defined in claim 13 further characterized by said drive motor being a stepping motor, and said means responsive to said signal for driving said stepping motor including a means for producing driving pulses transmitted to said stepping motor the pulse repetition rate of which pulses is directly related to the argument of said signal.

15. In a system for energizing a drive motor the combination comprising, a drive motor; and control means for controlling the energization of said motor to accelerate it during an acceleration period from a low speed to a high speed, to maintain such high speed for a given time, and to then decelerate it during a deceleration period from said high speed to said low speed; said control means including means utilizing an input signal independent of the condition of said motor for causing the speed of said motor during said acceleration period to increase at a rate which progressively decreases with time without increasing at any point, and means utilizing an input signal independent of the condition of said motor for causing the speed of said motor during said deceleration period to decrease at a rate which progressively increases with time without decreasing at any point.

16. The combination defined in claim 15 further characterized by said control means being such that said acceleration period is longer than said deceleration period.

References Cited

UNITED STATES PATENTS

| | | | |
|---|---|---|---|
| 3,109,974 | 11/1963 | Hallmark | 318—20.110 |
| 3,110,865 | 11/1963 | Scuitto | 318—20.110 |
| 3,122,691 | 2/1964 | Centner et al. | 318—20.110 |
| 3,204,132 | 8/1965 | Benaglio et al. | 318—20.110 |
| 3,122,687 | 2/1964 | Romvari | 318—20.050 |
| 3,209,338 | 9/1965 | Romvari | 318—20.050 |
| 3,328,658 | 6/1967 | Thompson | 318—138 |

ORIS L. RADER, Primary Examiner

K. L. CROSSON, Assistant Examiner

U.S. Cl. X.R.

318—18, 162, 417